(12) United States Patent
Ota et al.

(10) Patent No.: US 11,402,264 B2
(45) Date of Patent: Aug. 2, 2022

(54) PHOTOELECTRIC CONVERSION DEVICE, METHOD OF DRIVING PHOTOELECTRIC CONVERSION DEVICE, IMAGING SYSTEM, AND MOVING BODY

(71) Applicant: CANON KABUSHIKI KAISHA, Tokyo (JP)

(72) Inventors: Yasuharu Ota, Kawasaki (JP); Yukihiro Kuroda, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 251 days.

(21) Appl. No.: 16/670,178

(22) Filed: Oct. 31, 2019

(65) Prior Publication Data
US 2020/0158566 A1 May 21, 2020

(30) Foreign Application Priority Data
Nov. 21, 2018 (JP) .............................. JP2018-218224

(51) Int. Cl.
*G01J 1/44* (2006.01)
*G05D 1/02* (2020.01)
(Continued)

(52) U.S. Cl.
CPC .............. *G01J 1/44* (2013.01); *G05D 1/0246* (2013.01); *H04N 5/3698* (2013.01);
(Continued)

(58) Field of Classification Search
CPC ................... G01J 1/44; G01J 2001/442; G01J 2001/4466; G05D 1/0246;
(Continued)

(56) References Cited

U.S. PATENT DOCUMENTS

| 7,709,869 B2 | 5/2010 | Kuroda |
|---|---|---|
| 7,911,521 B2 | 3/2011 | Kuroda |

(Continued)

FOREIGN PATENT DOCUMENTS

| JP | H09162437 A | * | 6/1997 |
|---|---|---|---|
| JP | 2009-508102 | | 2/2009 |

(Continued)

OTHER PUBLICATIONS

"Single-Photon Synchronous Detection," by Christiano Niclass et. al., IEEE Journal of Solid-State Circuits, vol. 44, No. 7, Jul. 2009.

(Continued)

*Primary Examiner* — Thanh Luu
*Assistant Examiner* — Monica T Taba
(74) *Attorney, Agent, or Firm* — Venable LLP

(57) ABSTRACT

A photoelectric conversion device includes an avalanche multiplying photodiode, a signal generation unit that includes a control unit configured to control an applied voltage to the photodiode and generates a photon detection pulse based on an output generated by incidence of a photon to the photodiode, and a counter that counts the photon detection pulse output from the signal generation unit, and the counter outputs a setting value detection signal when a count value of the photon detection pulse reaches a predetermined setting value, and in response to receiving the setting value detection signal, the control unit controls the applied voltage to the photodiode so as to stop generation of an avalanche current in the photodiode.

15 Claims, 14 Drawing Sheets

(51) Int. Cl.
*H04N 5/369* (2011.01)
*H04N 5/374* (2011.01)
*H04N 5/378* (2011.01)

(52) U.S. Cl.
CPC ............. *H04N 5/374* (2013.01); *H04N 5/378* (2013.01); *G01J 2001/442* (2013.01); *G01J 2001/4466* (2013.01); *G05D 2201/0213* (2013.01)

(58) Field of Classification Search
CPC ......... G05D 2201/0213; H04N 5/3698; H04N 5/374; H04N 5/378; H04N 5/37455; H04N 5/359; H04N 5/335; H04N 5/23241; H04N 5/369
See application file for complete search history.

(56) References Cited

U.S. PATENT DOCUMENTS

| | | | |
|---|---|---|---|
| 7,935,995 | B2 | 5/2011 | Watanabe |
| 8,174,599 | B2 | 5/2012 | Kuroda |
| 8,222,682 | B2 | 7/2012 | Watanabe |
| 8,223,238 | B2 | 7/2012 | Kuroda |
| 8,345,137 | B2 | 1/2013 | Shinohara |
| 8,390,713 | B2 | 3/2013 | Kuroda |
| 8,670,058 | B2 | 3/2014 | Hayashi |
| 8,710,558 | B2 | 4/2014 | Inoue |
| 8,994,862 | B2 | 3/2015 | Kuroda |
| 9,236,406 | B2 | 1/2016 | Kuroda |
| 9,305,954 | B2 | 4/2016 | Kuroda |
| 9,357,122 | B2 | 5/2016 | Kususaki |
| 9,445,023 | B2 | 9/2016 | Kuroda |
| 9,762,837 | B2 | 9/2017 | Kuroda |
| 10,021,316 | B2 | 7/2018 | Kuroda |
| 10,404,932 | B2 | 9/2019 | Kuroda |
| 2011/0266420 | A1 | 11/2011 | Eldesouki |
| 2012/0175503 | A1 | 7/2012 | Kuroda |
| 2015/0281610 | A1 | 10/2015 | Ota |
| 2017/0131143 | A1* | 5/2017 | Andreou ........... H01L 31/02027 |
| 2018/0108800 | A1* | 4/2018 | Morimoto ......... H01L 31/02005 |
| 2018/0316884 | A1 | 11/2018 | Kuroda |
| 2019/0238780 | A1 | 8/2019 | Goden |
| 2019/0302242 | A1* | 10/2019 | Fenigstein ........ H01L 31/02005 |
| 2019/0305146 | A1 | 10/2019 | Kuroda |
| 2020/0018832 | A1 | 1/2020 | Azuma |

FOREIGN PATENT DOCUMENTS

| | | |
|---|---|---|
| JP | 2012-60012 | 3/2012 |
| JP | 2019-9768 | 1/2019 |
| WO | 2016/003451 | 1/2016 |
| WO | 2017/219223 | 12/2017 |

OTHER PUBLICATIONS

European Search Report dated Feb. 5, 2020 issued in corresponding European application No. 19207569.5.
U.S. Appl. No. 16/716,668, filed Dec. 17, 2019 by Hajime Ikeda et al.
U.S. Appl. No. 16/556,473, filed Aug. 30, 2019 by Yukihiro Kuroda.
Japanese Office Action dated Sep. 8, 2020 in corresponding Japanese application No. 2018-218224 (with whole English translation).
European Search Report dated Jan. 13, 2022 in corresponding European Application No. 19207569.5.
Cristiano Niclass et al., A Single Photon Avalanche Diode Array Fabricated in Deep-Submicron CMOS Technology, Ecole Polytechnique Federate de Lausanne (EPFL) CH-1015 Lausanne, Switzerland, Mar. 10, 2006, pp. 81-86.

* cited by examiner

PHOTOELECTRIC CONVERSION DEVICE, METHOD OF DRIVING PHOTOELECTRIC CONVERSION DEVICE, IMAGING SYSTEM, AND MOVING BODY

BACKGROUND OF THE INVENTION

Field of the Invention

The present disclosure relates to a photoelectric conversion device, a method of driving a photoelectric conversion device, an imaging system, and a moving body.

Description of the Related Art

A photon-count type photoelectric conversion device that digitally counts the number of photons that enter a light receiving unit and outputs the counted value from a pixel including the receiving unit as a digital signal is known. The specification of U.S. Patent Application Publication No. 2011/0266420 discloses an imaging device in which a plurality of pixels that output a counted value of photons as digital signals are arranged.

In a photon-count type photoelectric conversion device, the larger the number of photons entering a light receiving unit is, the larger the number of times of a circuit operation required for detecting photons is. On the other hand, the number of photons that can be counted is limited to au upper count limit value of a mounted counter. Thus, in a pixel in which the upper count limit value is reached before a predetermined exposure period ends, an operation to detect a photon that would not be counted is performed until the end of the exposure period, which causes unnecessary power consumption. Further, with the increased frequency of photon detection operations, a current flowing in a power supply interconnection increases, and thus the power supply voltage drops in accordance with the interconnection resistance, which may cause an unstable circuit operation.

SUMMARY OF THE INVENTION

The present disclosure intends to provide a photoelectric conversion device and an imaging system that can achieve a reduction in power consumption and an improvement in stability of the circuit operation.

According to one aspect of the present disclosure, provided is a photoelectric conversion device including an avalanche multiplying photodiode, a signal generation unit that includes a control unit configured to control an applied voltage to the photodiode and generates a photon detection pulse based on an output generated by incidence of a photon to the photodiode, and a counter that counts the photon detection pulse output from the signal generation unit, wherein the counter outputs a setting value detection signal when a count value of the photon detection pulse reaches a predetermined setting value, and wherein in response to receiving the setting value detection signal, the control unit controls the applied voltage to the photodiode so as to stop generation of an avalanche current in the photodiode.

Further, according to another aspect of the present disclosure, provided is a method of driving a photoelectric conversion device including an avalanche multiplying photodiode, a signal generation unit that controls an applied voltage to the photodiode and generates a photon detection pulse based on an output generated by incidence of a photon to the photodiode, and a counter that counts the photon detection pulse output from the signal generation unit, the method including in a counting period from reset of the counter to readout of a count value, increasing the count value in response to the photon detection pulse when the count value does not reach a predetermined setting value and stopping generation of an avalanche current in the photodiode when the count value reaches the setting value.

Further features of the present disclosure will become apparent from the following description of exemplary embodiments with reference to the attached drawings.

DESCRIPTION OF THE EMBODIMENTS

First Embodiment

A photoelectric conversion device and a method of driving the same according to a first embodiment of the present disclosure will be described with reference to FIG. 1 to FIG. 3.

Figure 1:
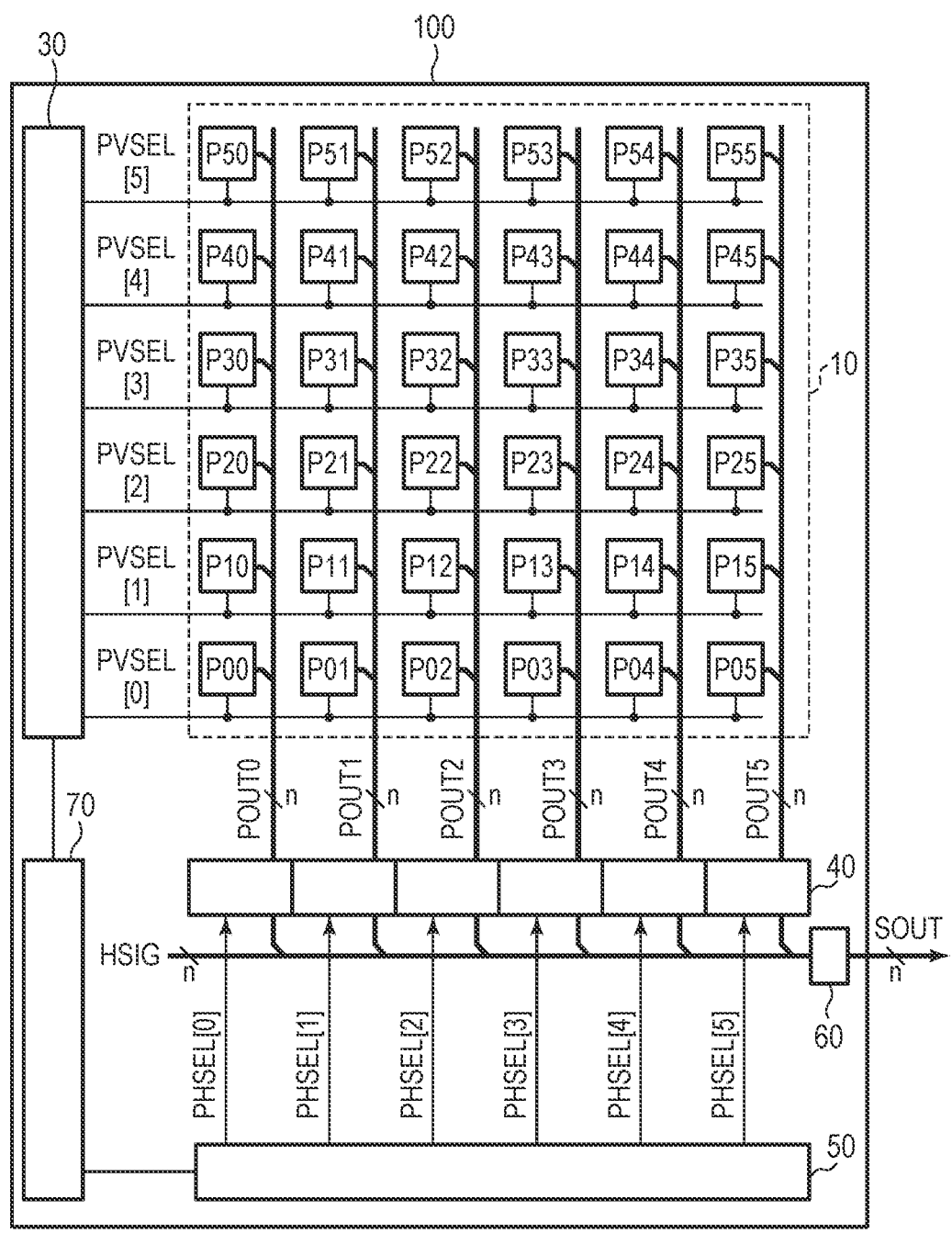
FIG. 1 is a block diagram illustrating a general configuration of a photoelectric conversion device according to a first embodiment of the present disclosure.

FIG. 1 is a block diagram illustrating a general configuration of a photoelectric conversion device according to the present embodiment. FIG. 2 is a block diagram illustrating a general configuration of a pixel in the photoelectric conversion device according to the present embodiment. FIG. 3 is a circuit diagram illustrating a configuration example of a pixel in the photoelectric conversion device according to the present embodiment.

As illustrated in FIG. 1, a photoelectric conversion device 100 according to the present embodiment includes a pixel region 10, a vertical select circuit 30, signal processing circuits 40, a horizontal select circuit 50, an output circuit 60, and a control circuit 70.

In the pixel region 10, a plurality of pixels P arranged in a matrix over a plurality of rows and a plurality of columns are provided. FIG. 1 illustrates 36 pixels P arranged on 6 rows from the 0-th row to the fifth row and 6 columns from the 0-th column to the fifth column along with a reference numeral indicating a row number and a column number. For example, a pixel P arranged at the first row, the fourth column is labeled with the reference "P14".

Note that the number of rows and the number of columns of a pixel array forming the pixel region 10 are not particularly limited. Further, in the pixel region 10, the pixels P are not necessarily required to be arranged two-dimensionally. For example, the pixel region 10 may be formed of a single pixel P, or pixels P may be arranged one-dimensionally in the row direction or the column direction in the pixel region 10.

On each row of the pixel array of the pixel region 10, a control line PVSEL is arranged extending in a first direction (the horizontal direction in FIG. 1). The control line PVSEL is connected to the pixels P aligned in the first direction, respectively, to form a signal line common to these pixels P. The first direction in which the control line PVSEL extends may be denoted as the row direction or the horizontal direction. Note that, in FIG. 1, the control line PVSEL is represented with a reference numeral indicating a row number. For example, a control line on the first row is labeled with the reference "PVSEL[1]".

The control line PVSEL on each row is connected to the vertical select circuit 30. The vertical select circuit 30 is a circuit unit that supplies control signals used for driving a signal generation circuit (not illustrated) within the pixel P to the pixels P via the control line PVSEL.

On each column of the pixel array of the pixel region 10, an output line POUT is arranged extending in a second direction (the vertical direction in FIG. 1) intersecting the first direction. The output line POUT is connected to the pixels P aligned in the second direction, respectively, to form a signal line common to these pixels P. The second direction in which the output line POUT extends may be denoted as the column direction or the vertical direction. Note that, in FIG. 1, the output line POUT is represented with a reference numeral indicating a column number. For example, an output line on the fourth column is labeled with the reference "POUT[4]". Each of the output lines POUT includes n signal lines used for outputting n-bit digital signal.

The output lines POUT are connected to the signal processing circuits 40, respectively. Each of the signal processing circuits 40 is provided in association with each column of the pixel array of the pixel region 10 and connected to the output line POUT on a corresponding column. The signal processing circuit 40 has a function of holding a signal output from the pixels P via the output line POUT on a corresponding column. Since a signal output from the pixel P is an n-bit signal input via n signal lines of the output lines POUT, each of the signal processing circuit 40 includes at least n holding units used for holding signals of respective bits.

The horizontal select circuit 50 is a circuit unit that supplies, to the signal processing circuits 40, control signals used for reading out signals from the signal processing circuits 40. The horizontal select circuit 50 supplies a control signal to the signal processing circuit 40 on each column via a control line PHSEL. The signal processing circuit 40 that has received a control signal from the horizontal select circuit 50 outputs a signal held in the holding unit to the output circuit 60 via the horizontal output line HSIG. Note that, in FIG. 1, the control line PHSEL is represented with a reference indicating a column number. For example, a control line on the fourth column is labeled with the reference "PHSEL[4]". Each of the horizontal output lines HSIG includes n signal lines used for outputting n-bit digital signal.

The output circuit 60 is a circuit unit for outputting a signal supplied via the horizontal output line HSIG to the outside of the photoelectric conversion device 100 as an output signal SOUT. The control circuit 70 is a circuit unit for supplying control signals that control the operations and their timings of the vertical select circuit 30, the signal processing circuits 40, the horizontal select circuit 50, and the output circuit 60. Note that at least some of the control signals that control the operations and their timings of the vertical select circuit 30, the signal processing circuits 40, the horizontal select circuit 50, and the output circuit 60 may be supplied from the outside of the photoelectric conversion device 100.

Figure 2:
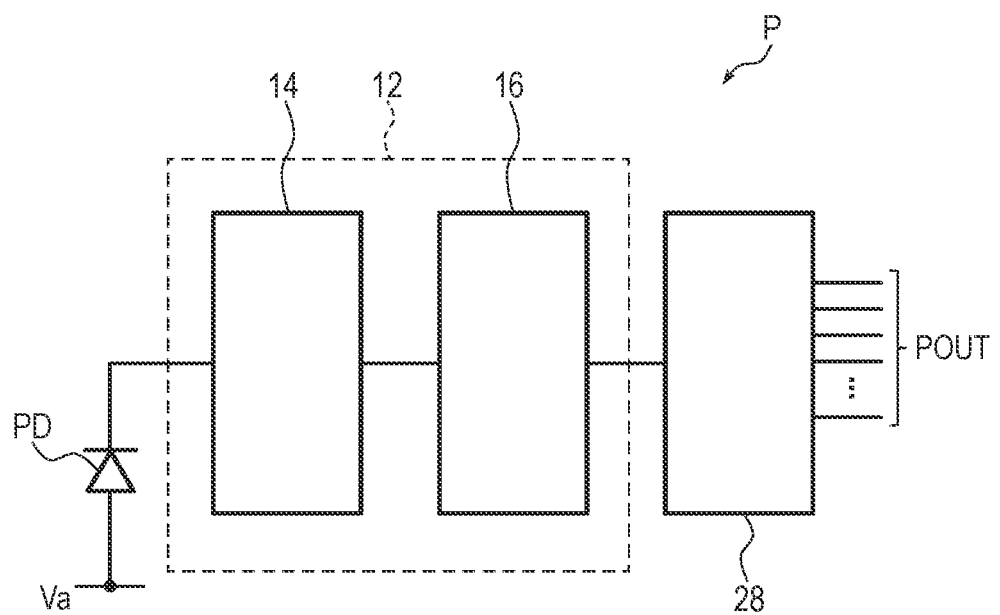
FIG. 2 is a diagram illustrating a general configuration of a pixel in the photoelectric conversion device according to the first embodiment of the present disclosure.

As illustrated in FIG. 2, each of the pixels P includes an avalanche multiplying photodiode PD, a signal generation circuit 12, and a counter 28. The signal generation circuit 12 includes a cathode voltage control circuit 14 and a control circuit 16. Note that, in this specification, the signal generation circuit 12 may be referred to as a signal generation unit, and the cathode voltage control circuit 14 may be referred to as a cathode voltage control unit.

The anode terminal of the photodiode PD is connected to a power supply node of a voltage Va. Typically, the voltage Va is a negative high voltage. The cathode terminal of the photodiode PD is connected to the cathode voltage control circuit 14. The cathode voltage control circuit 14 is connected to the control circuit 16. The control circuit 16 is connected to the counter 28.

The photodiode PD generates an avalanche current in response to photon incidence when a reverse bias voltage applied between the anode terminal and the cathode terminal is greater than or equal to a breakdown voltage Vbd. When an avalanche current flows in the photodiode PD, the voltage of the cathode terminal of the photodiode PD changes accordingly. The change in the voltage of the cathode terminal propagates to the control circuit 16 via the cathode voltage control circuit 14, and a photon detection pulse is output from the control circuit 16 to the counter 28. The signal generation circuit 12 has a function of controlling the applied voltage to the photodiode PD and generating a photon detection pulse based on the output generated by incidence of a photon to the photodiode.

The counter 28 counts photon detection pulses input from the control circuit 16. When the count value of photon detection pulses reaches an arbitrary setting value N, the counter 28 outputs a setting value detection signal to the control circuit 16. The setting value N is not particularly limited and may be set to the upper count limit value of the counter 28, for example. Further, the counter 28 outputs a held count value to the output line POUT as an n-bit digital signal in response to a control signal from the vertical select circuit 30.

The control circuit 16 has a function of controlling the cathode voltage control circuit 14 in response to a setting value detection signal received from the counter 28. That is, the control circuit 16 controls the cathode voltage control circuit 14 in response to receiving a setting value detection signal from the counter 28 and reduces a reverse bias voltage applied between the anode terminal and the cathode terminal of the photodiode PD to a voltage that is lower than the breakdown voltage Vbd. That is, the cathode voltage control circuit 14 functions as a control unit that controls the applied voltage to the photodiode PD, more specifically, controls the applied voltage to the cathode terminal of the photodiode PD. Thereby, the photodiode PD is in a state where no avalanche current occurs even when there is photon incidence.

Figure 3:
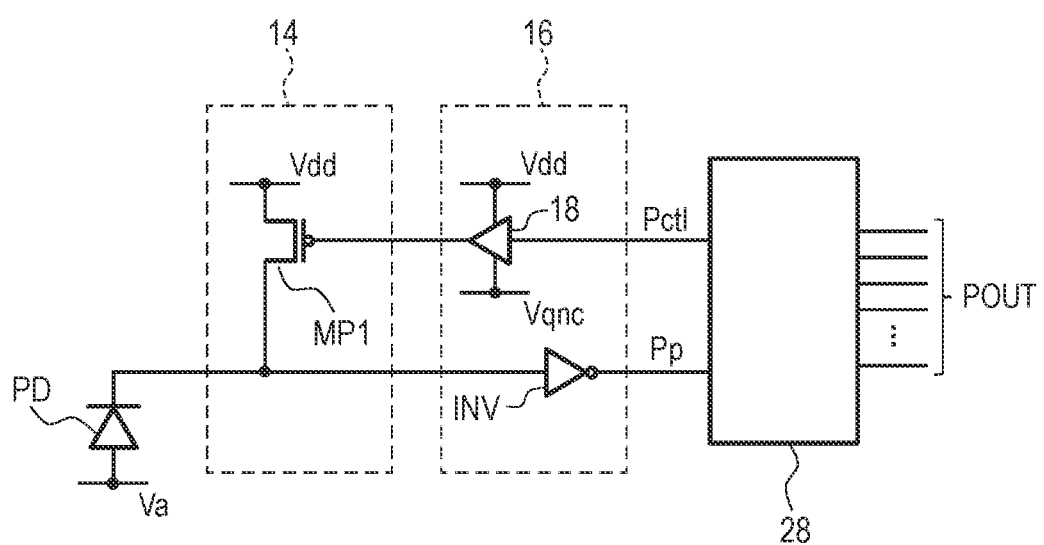
FIG. 3 is a circuit diagram illustrating a configuration example of a pixel in the photoelectric conversion device according to the first embodiment of the present disclosure.

FIG. 3 illustrates a schematic diagram of the pixel P including a specific configuration example of the cathode voltage control circuit 14 and the control circuit 16. As illustrated in FIG. 3, the cathode voltage control circuit 14 may be formed of a p-channel MOS transistor MP1. Further, the control circuit 16 may be formed of an inverter circuit INV and a buffer circuit 18.

The input terminal of the inverter circuit INV is connected to the cathode terminal of the photodiode PD. The output terminal of the inverter circuit INV is connected to the counter 28. The input terminal of the buffer circuit 18 is connected to the counter 28. The output terminal of the buffer circuit 18 is connected to the gate terminal of the p-channel MOS transistor MP1. The source terminal of the p-channel MOS transistor MP1 is connected to a power supply node of a voltage Vdd. The drain terminal of the p-channel MOS transistor MP1 is connected to the connection node of the cathode terminal of the photodiode PD and the input terminal of the inverter circuit INV.

The inverter circuit INV forms a waveform shaping unit that converts a voltage change at the cathode terminal of the photodiode PD into a pulse signal and outputs a photon detection pulse Pp. The buffer circuit 18 outputs the voltage Vdd when a setting value detection signal Pctl output from the counter 28 is at a High level (H level) and outputs a voltage Vqnc when the setting value detection signal Pctl is at a Low level (L level). The voltage Vqnc is a voltage provided to the buffer circuit 18 as a reference voltage on the L level side, which is a lower voltage than the voltage Vdd. The voltage Vqnc is appropriately set so that the p-channel MOS transistor MP1 functions as a desired quench resistor when the voltage Vqnc is provided to the gate of the p-channel MOS transistor MP1.

As described above, the cathode voltage control circuit 14 is configured to connect the drain terminal of the p-channel MOS transistor MP1 to the cathode terminal of the photodiode PD. Since the gate voltage during operation of the p-channel MOS transistor MP1 is a fixed voltage, a quench circuit formed of the p-channel MOS transistor MP1 is a passive type, that is, a passive recharge and passive quench type.

Here, the term "recharge" means an operation to increase the reverse bias voltage of the photodiode PD to be greater than or equal to the breakdown voltage Vbd so as to enable avalanche multiplication. Further, the term "quench" means an operation to reduce the reverse bias voltage of the photodiode PD to be less than the breakdown voltage Vbd so as not to generate avalanche multiplication.

In the initial state where the count value is reset to zero (0), the setting value detection signal Pctl output from the counter 28 is at the L level. Thus, the voltage Vqnc is applied to the gate of the p-channel MOS transistor MP1 of the cathode voltage control circuit 14, the p-channel MOS transistor MP1 is turned on.

Accordingly, the cathode terminal of the photodiode PD is recharged up to the voltage Vdd via the p-channel MOS transistor MP1. The magnitude of the reverse bias voltage applied between both terminals of the photodiode PD at this time is expressed as below. Here, a voltage Vex (excess bias) indicates a voltage value corresponding to a part exceeding the breakdown voltage Vbd of the reverse bias voltage value applied to the photodiode PD.

$|Va-Vdd|=Vbd+Vex$

When a photon enters the photodiode PD in this state, an avalanche current occurs in the photodiode PD, and the voltage of the cathode terminal of the photodiode PD decreases to (Vdd−Vex). The cathode terminal of the photodiode PD is then recharged to the voltage Vdd again via the p-channel MOS transistor MP1. The waveform of this voltage change at the cathode terminal is shaped by the inverter circuit INV of the control circuit 16, and thereby the photon detection pulse Pp is generated.

The counter 28 counts the photon detection pulse Pp input from the control circuit 16. That is, the counter 28 increments the count value one by one every time receiving one photon detection pulse Pp. When the count value reaches the arbitrary setting value N, the counter 28 causes the setting value detection signal Pctl to transition from the L level to the H level.

When the setting value detection signal Pctl transitions to the H level, the output of the buffer circuit 18 of the control circuit 16 becomes the voltage Vdd, and the p-channel MOS transistor MP1 of the cathode voltage control circuit 14 is turned off.

Accordingly, after the count value reaches the setting value N, the cathode terminal is no longer recharged even when a photon enters the photodiode PD and an avalanche current flows, and the voltage applied between both the terminals of the photodiode PD becomes less than the breakdown voltage Vbd. At this time, the off-resistance of the p-channel MOS transistor MP1 is sufficiently large, and in at least a period until an operation to reset the count value, the voltage applied between both the terminals of the photodiode PD is maintained to be less than the breakdown voltage Vbd.

If the voltage applied between both the terminals of the photodiode PD is less than the breakdown voltage Vbd, since no avalanche current occurs even when a photon enters the photodiode PD, a circuit operation of the cathode voltage control circuit 14, the control circuit 16, and the counter 28 stop. Therefore, power consumption can be reduced in a period until the count value is reset. Further, since current consumption can be reduced, the power supply voltage drop due to a wiring resistance of a power supply interconnection used for supplying the voltage Vdd or the voltage Va decreases, which can improve stability of the circuit operation.

As described above, according to the present embodiment, it is possible to achieve a reduction in power consumption and an improvement in stability of the circuit operation in the photoelectric conversion device.

Second Embodiment

Figure 4:
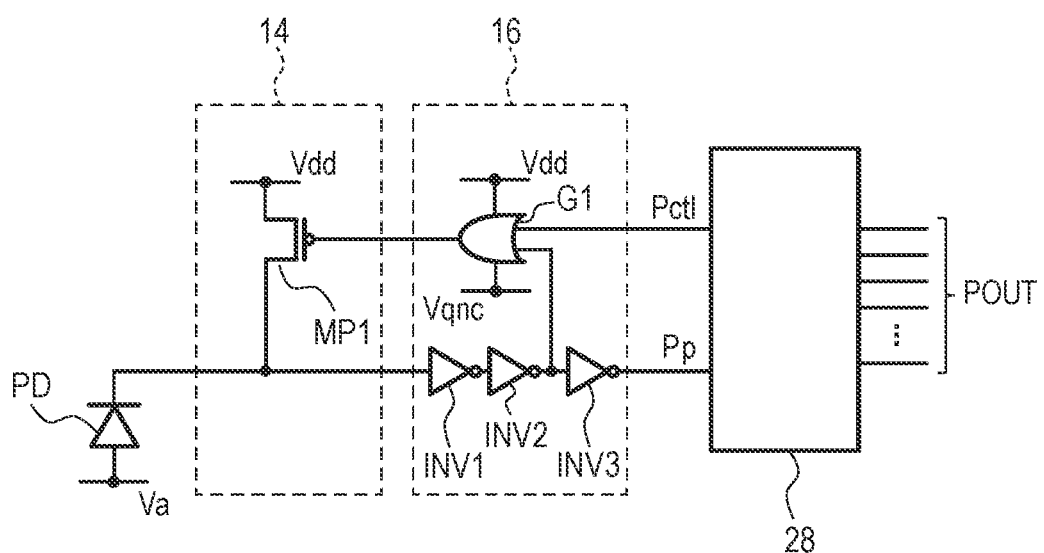
FIG. 4 is a circuit diagram illustrating a configuration example of a pixel in a photoelectric conversion device according to a second embodiment of the present disclosure.

A photoelectric conversion device according to a second embodiment of the present disclosure will be described with reference to FIG. 4. The same components as those of the photoelectric conversion device according to the first embodiment are labeled with the same references, and the description thereof will be omitted or simplified. FIG. 4 is a circuit diagram illustrating a configuration example of a pixel of the photoelectric conversion device according to the present embodiment.

The photoelectric conversion device according to the present embodiment is the same as the photoelectric conversion device according to the first embodiment except that the configuration of the control circuit 16 is different. That is, as illustrated in FIG. 4, for example, the control circuit 16 of the photoelectric conversion device according to the present embodiment may be formed of inverter circuits INV1, INV2, and INV3 and an OR gate circuit G1.

The input terminal of the inverter circuit INV1 is connected to the connection node of the cathode terminal of the photodiode PD and the drain terminal of the p-channel MOS transistor MP1. The output terminal of the inverter circuit INV1 is connected to the input terminal of the inverter circuit INV2. The output terminal of the inverter circuit INV2 is connected to the input terminal of the inverter circuit INV3. The output terminal of the inverter circuit INV3 is connected to the counter 28. The two input terminals of the OR gate circuit G1 are connected to the counter 28 and the connection node between the inverter circuit INV2 and the inverter circuit INV3. The output terminal of the OR gate circuit G1 is connected to the gate of the p-channel MOS transistor MP1.

The inverter circuit INV1, INV2, and INV3 form a waveform shaping unit that converts a voltage change at the cathode terminal of the photodiode PD into a pulse signal and outputs the photon detection pulse Pp. If both the setting value detection signal Pctl output from the counter 28 and the output signal of the inverter circuit INV2 are at the L level, the OR gate circuit G1 outputs the voltage Vqnc and if not, outputs the voltage Vdd. The voltage Vqnc is a voltage provided to the OR gate circuit G1 as a reference voltage on the L level side, which is a lower voltage than the voltage Vdd. The voltage Vqnc is appropriately set so that the p-channel MOS transistor MP1 functions as a desired quench resistor when the voltage Vqnc is provided to the gate of the p-channel MOS transistor MP1.

The control circuit 16 of the present embodiment is configured to be able to control the gate voltage of the p-channel MOS transistor MP1 of the cathode voltage control circuit 14 actively in accordance with a change in the voltage of the cathode terminal. That is, the circuit of the present embodiment is an active recharge and passive quench type. In the present embodiment, by reducing the on-resistance of the p-channel MOS transistor MP1 of the cathode voltage control circuit 14 to be lower than that in the case of the first embodiment, it is possible to actively advance recharging.

Also in the present embodiment, when the count value of the counter 28 reaches the arbitrary setting value N, the setting value detection signal Pctl transitions to the H level, and the cathode terminal of the photodiode PD is no longer recharged. Thereby, the voltage applied to both the terminals of the photodiode PD is less than the breakdown voltage Vbd, and it is possible to leave the circuit operation stopped even when there is photon incidence.

As described above, according to the present embodiment, it is possible to achieve a reduction in power consumption and an improvement in stability of the circuit operation in the photoelectric conversion device.

Third Embodiment

Figure 5:
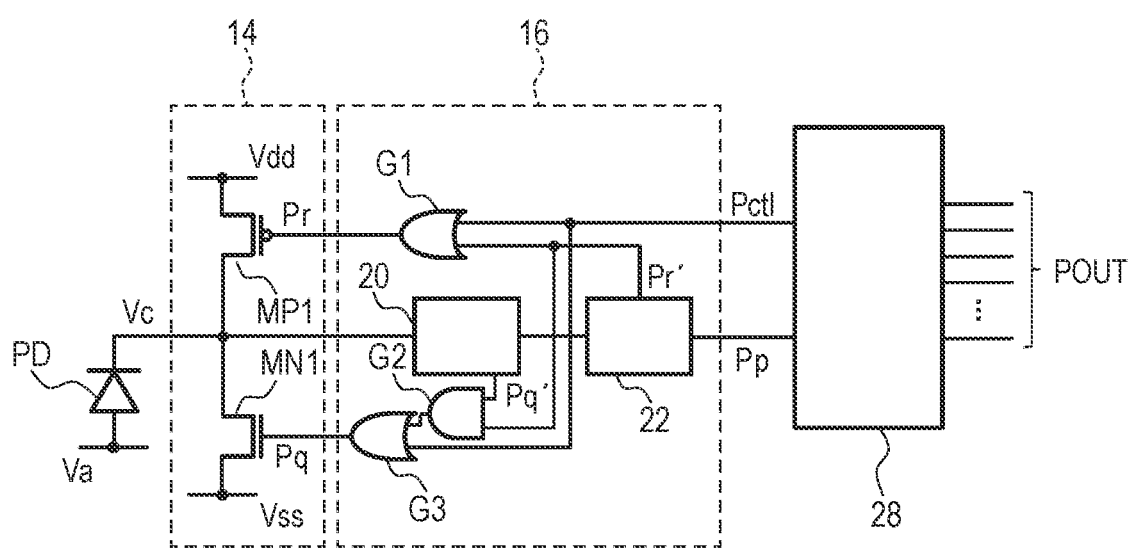
FIG. 5 is a circuit diagram illustrating a configuration example of a pixel in a photoelectric conversion device according to a third embodiment of the present disclosure.
Figure 6:
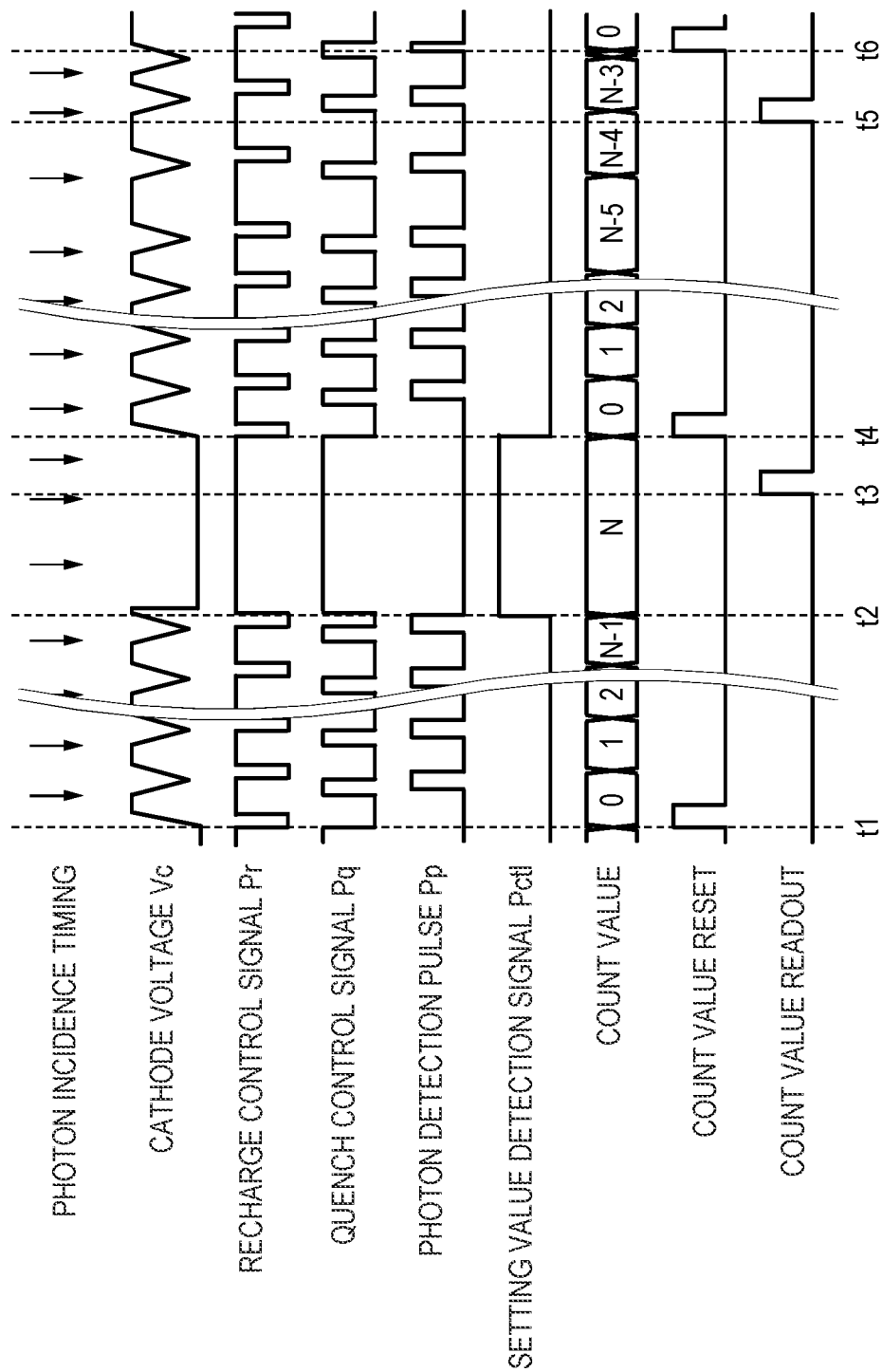
FIG. 6 is a timing diagram illustrating an operation of the photoelectric conversion device according to the third embodiment of the present disclosure.
Figure 7:
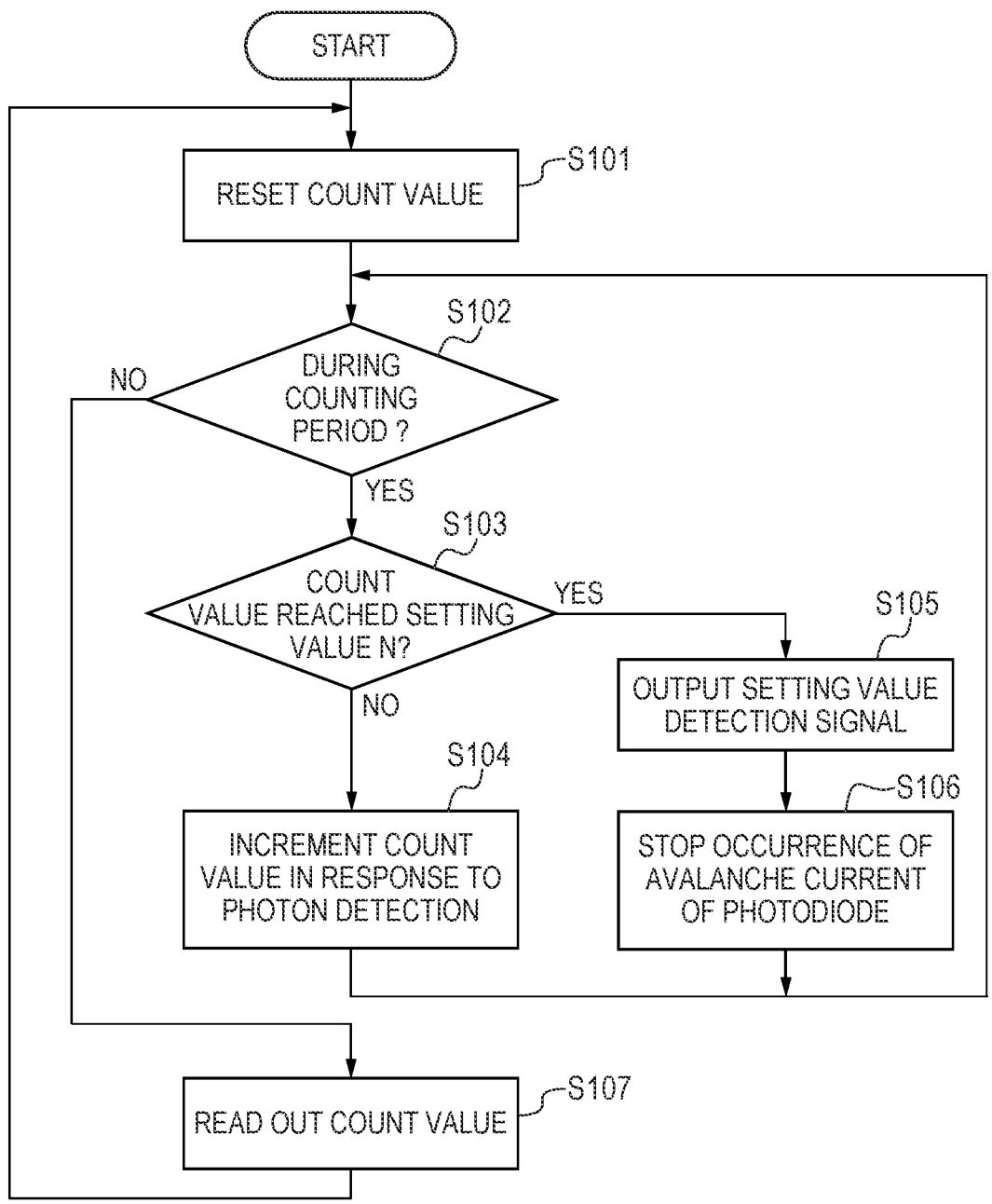
FIG. 7 is a flowchart illustrating a method of driving the photoelectric conversion device according to the third embodiment of the present disclosure.

A photoelectric conversion device according to a third embodiment of the present disclosure will be described with reference to FIG. 5 to FIG. 7. The same components as those of the photoelectric conversion device according to the first and second embodiment are labeled with the same references, and the description thereof will be omitted or simplified. FIG. 5 is a circuit diagram illustrating a configuration example of a pixel in the photoelectric conversion device according to the present embodiment. FIG. 6 is a timing diagram illustrating an operation of the photoelectric conversion device according to the present embodiment. FIG. 7 is a flowchart illustrating a method of driving the photoelectric conversion device according to the present embodiment.

The photoelectric conversion device according to the present embodiment is different in the configuration of the cathode voltage control circuit 14 and the control circuit 16 from the photoelectric conversion device according to the first and second embodiments. Other features are the same as those of the photoelectric conversion devices of the first and the second embodiments.

That is, as illustrated in FIG. 5, for example, the cathode voltage control circuit 14 in the photoelectric conversion device according to the present embodiment may be formed of a p-channel MOS transistor MP1 and an n-channel MOS transistor MN1. The drain terminal of the p-channel MOS transistor MP1 and the drain terminal of the n-channel MOS transistor MN1 are connected to the cathode terminal of the photodiode PD. The source terminal of the p-channel MOS transistor MP1 is connected to the power supply node of the voltage Vdd. The source terminal of the n-channel MOS transistor MN1 is connected to the reference voltage node of the voltage Vss.

Further, as illustrated in FIG. 5, for example, the control circuit 16 in the photoelectric conversion device according to the present embodiment may be formed of timing control circuits 20 and 22, OR gate circuits G1 and G3, and an AND gate circuit G2. The connection node of the cathode terminal of the photodiode PD, the drain terminal of the p-channel MOS transistor MP1, and the drain terminal of the n-channel MOS transistor MN1 is connected to the counter 28 via the timing control circuits 20 and 22. One of the two input terminals of the OR gate circuit G1 is connected to the timing control circuit 22 and the other of the two input terminals of the OR gate circuit G1 is connected to the counter 28. The output terminal of the OR gate circuit G1 is connected to the gate of the p-channel MOS transistor MP1. One of the two input terminals of the AND gate circuit G2 is connected to the timing control circuit 20 and the other of the two input terminals of the AND gate circuit G2 is connected to the timing control circuit 22. One of the two input terminals of the OR gate circuit G3 is connected to the output terminal of the AND gate circuit G2 and the other of the two input terminals of the OR gate circuit G3 is connected to the counter 28. The output terminal of the OR gate circuit G3 is connected to the gate of the n-channel MOS transistor MN1.

The timing control circuits 20 and 22 are circuits for controlling the timing of the recharge operation or the quench operation in the cathode voltage control circuit 14 in response to a change in the voltage Vc of the cathode terminal of the photodiode PD. For example, the timing control circuits 20 and 22 may be formed of a delay circuit in which multiple stages of inverter circuits are connected in series, a delay circuit in which a resistance and a capacitance of various devices are used, or the like. Note that the timing control circuits 20 and 22 as a whole also have a function as a waveform shaping unit that converts a change in the voltage Vc of the cathode terminal of the photodiode PD into a pulse signal and outputting the pulse signal as the photon detection pulse Pp. In this specification, the timing control circuits 20 and 22 may be denoted as a timing control unit.

The OR gate circuit G1 performs logical sum operation of a control signal Pr', which is the output of the timing control circuit 22, and the setting value detection signal Pctl and supplies the recharge control signal Pr, which is an operation result, to the gate terminal of the p-channel MOS transistor MP1. Thereby, the p-channel MOS transistor MP1 forms a recharge circuit.

The AND gate circuit G2 performs logical product operation of a control signal Pq', which is the output of the timing control circuit 22, and the control signal Pr', which is the output of the timing control circuit 20. The OR gate circuit G3 performs logical sum operation of the setting value detection signal Pctl and the output signal of the AND gate circuit G2 and supplies the quench control signal Pq, which is an operation result, to the gate terminal of the n-channel MOS transistor MN1. Thereby, the n-channel MOS transistor MN1 forms a quench circuit.

Next, an operation example of the photoelectric conversion device according to the present embodiment will be described by using FIG. 6. FIG. 6 illustrates the photon incidence timing, the count value, and the timings of count value reset and count value readout in addition to the voltage Vc, the recharge control signal Pr, the quench control signal Pq, the photon detection pulse Pp, and the setting value detection signal Pctl. The photon incidence timing indicates the timing when a photon enters the photodiode PD. The count value indicates the count value of the counter 28. The count value reset indicates the timing when the count value of the counter 28 is reset. The count value readout indicates the timing when the count value of the counter 28 is externally output.

It is here assumed that the timing control circuit 20 outputs, as the logically inverted control signal Pq', a signal obtained by converting a change in the voltage Vc of the cathode terminal of the photodiode PD into a pulse signal after a predetermined delay time. Further, it is assumed that the timing control circuit 22 outputs the control signal Pq' as the logically inverted control signal Pr' after a predetermined delay time.

First, at time t1, the count value reset signal transitions to the H level, and the count value of the counter 28 is reset to zero (0).

In response to a photon entering the photodiode PD, an avalanche current occurs in the photodiode PD, and the voltage Vc of the cathode terminal of the photodiode PD decreases. When the voltage Vc of the cathode terminal starts decreasing, the control signal Pq' output from the timing control circuit 20 in response to a change in the voltage Vc transitions to the H level after a predetermined delay time. At this time, since the control signal Pr' output from the timing control circuit 22 in the initial state is at the H level, the quench control signal Pq also transitions to the H level in response to the H-level control signals Pq' and Pr', and the n-channel MOS transistor MN1 is turned on. Thereby, the reduction of the voltage Vc further continues via the n-channel MOS transistor MN1, the reverse bias voltage applied between both the terminals of the photodiode PD becomes less than the breakdown voltage Vbd, and the avalanche current no longer occurs (quench operation).

Next, when the control signal Pr' transitions to the L level after a predetermined delay time in response to the H-level control signal Pq', the quench control signal Pq transitions to the L level in response to the L-level control signal Pr', and the re-channel MOS transistor MN1 is turned off. Further, the recharge control signal Pr transitions to the L level in response to the L-level control signal Pr', and the p-channel MOS transistor MP1 is turned on. Thereby, recharging of the photodiode PD is started, and the reverse bias voltage applied to both the terminals of the photodiode PD returns to the voltage that is greater than or equal to the breakdown voltage Vbd again (recharge operation).

The recharge operation and the quench operation described above are repeated at every time there is incidence of a photon, and the photon detection pulses Pp are output from the control circuit 16 to the counter 28, where the number of photon detection pulses Pp corresponds to the number of repetitions. The counter 28 counts the photon detection pulse Pp output from the control circuit 16. Such a series of operations is repeated until time t2 when the count value of the photon detection pulse Pp reaches a predetermined setting value N.

At the time t2, when the count value reaches the arbitrary setting value N, the counter 28 controls the setting value detection signal Pctl from the L level to the H level. Thereby, the recharge control signal Pr and the quench control signal Pq both transition to the H level, the p-channel MOS transistor MP1 is turned off, and the re-channel MOS transistor MN1 is turned on. As a result, the cathode terminal of the photodiode PD is connected to the reference voltage node via the n-channel MOS transistor MN1, and the voltage Vc of the cathode terminal decreases to the voltage Vss. At this time, since the reverse bias voltage applied between both the terminals of the photodiode PD is less than the breakdown voltage Vbd, the avalanche current no longer occurs, and the cathode voltage Vss is fixed. Thereby, the circuit operations of the cathode voltage control circuit 14 and the control circuit 16 are stopped, and the power consumption is suppressed to the minimum.

Next, at time t3, the count value (the setting value N) held by the counter 28 is read out to an external circuit.

Next, at time t4, the count value reset signal transitions to the H level, and the count value of the counter 28 is reset to zero (0). Accordingly, counting of the number of incident photons is newly started with a similar operation.

Next, at time t5, the count value (N−4) held by the counter 28 is read out to the external circuit.

Next, at time t6, a count value reset signal transitions to the H level, and the count value of the counter 28 is reset to zero (0). Note that, since the count value does not reach the setting value N until the time t6, the setting value detection signal Pctl remains at the L level during a period from the time t4 to the time t6. In such a way, unless the count value reaches the arbitrary setting value N, the photon detection operation continues until the time immediately before the count value is reset.

Next, the method of driving the photoelectric conversion device according to the present embodiment will be described by using FIG. 7. First, the count value of the counter 28 is reset (step S101).

Next, it is determined whether or not the current time is in a counting period (step S102). Here, a counting period refers to a period from time immediately after a timing of resetting a count value to time immediately before a timing of reading out the count value. As a result of determination, if it is determined that the counting period is ongoing (step S102, "Yes"), the process proceeds to steps S103, and if it is determined that the counting period is not ongoing (step S102, "No"), the process proceeds to steps S107.

If it is determined that the counting period is ongoing in step S102, it is determined whether or not the count value of the counter 28 reaches the arbitrary setting value N (step S103). As a result of the determination, if the count value does not reach the arbitrary setting value N (step S103, "No"), the count value is incremented in response to a photon detection (step S104), and the process returns to step S102. If the count value reaches the arbitrary setting value N (step S103, "Yes"), the setting value detection signal Pctl is output from the counter 28 to the control circuit 16 (step S105). Then, after stopping the occurrence of the avalanche current of the photodiode PD (step S106), the process returns to step S102.

If it is determined that no counting period is ongoing in step S102, readout of the count value from the counter 28 is performed in step S107. The process then returns to step S101 and performs repetition of the same procedure.

As described above, according to the present embodiment, it is possible to achieve a reduction in power consumption and an improvement in stability of the circuit operation in the photoelectric conversion device.

Fourth Embodiment

Figure 8:
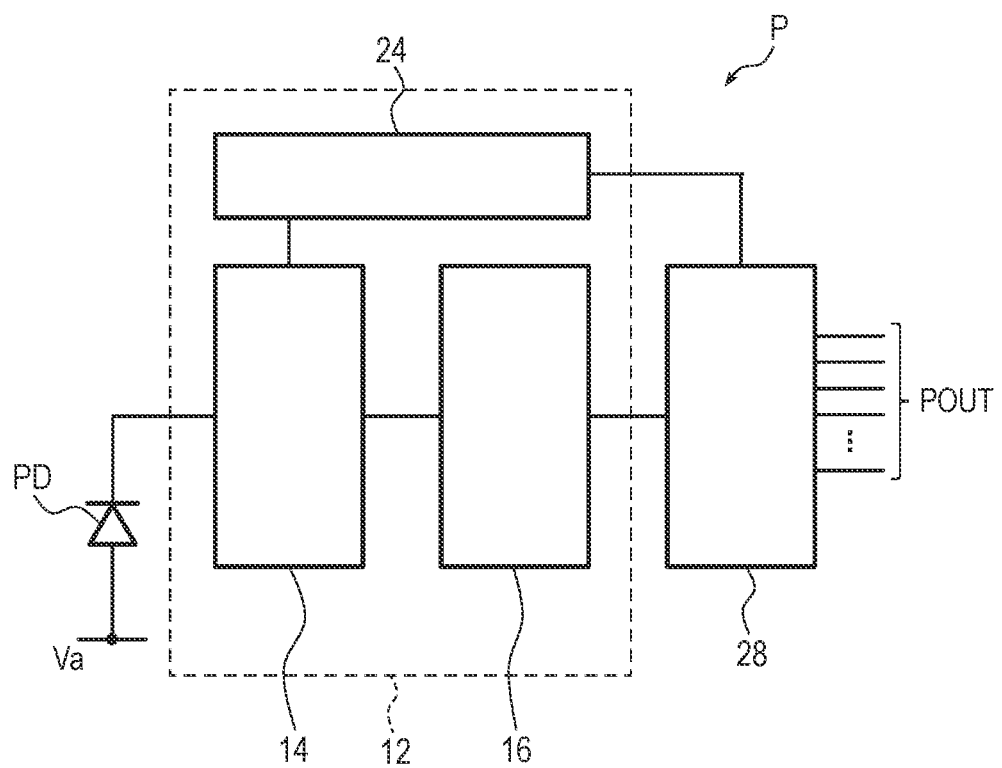
FIG. 8 is a diagram illustrating a general configuration of a pixel in a photoelectric conversion device according to a fourth embodiment of the present disclosure.
Figure 9:
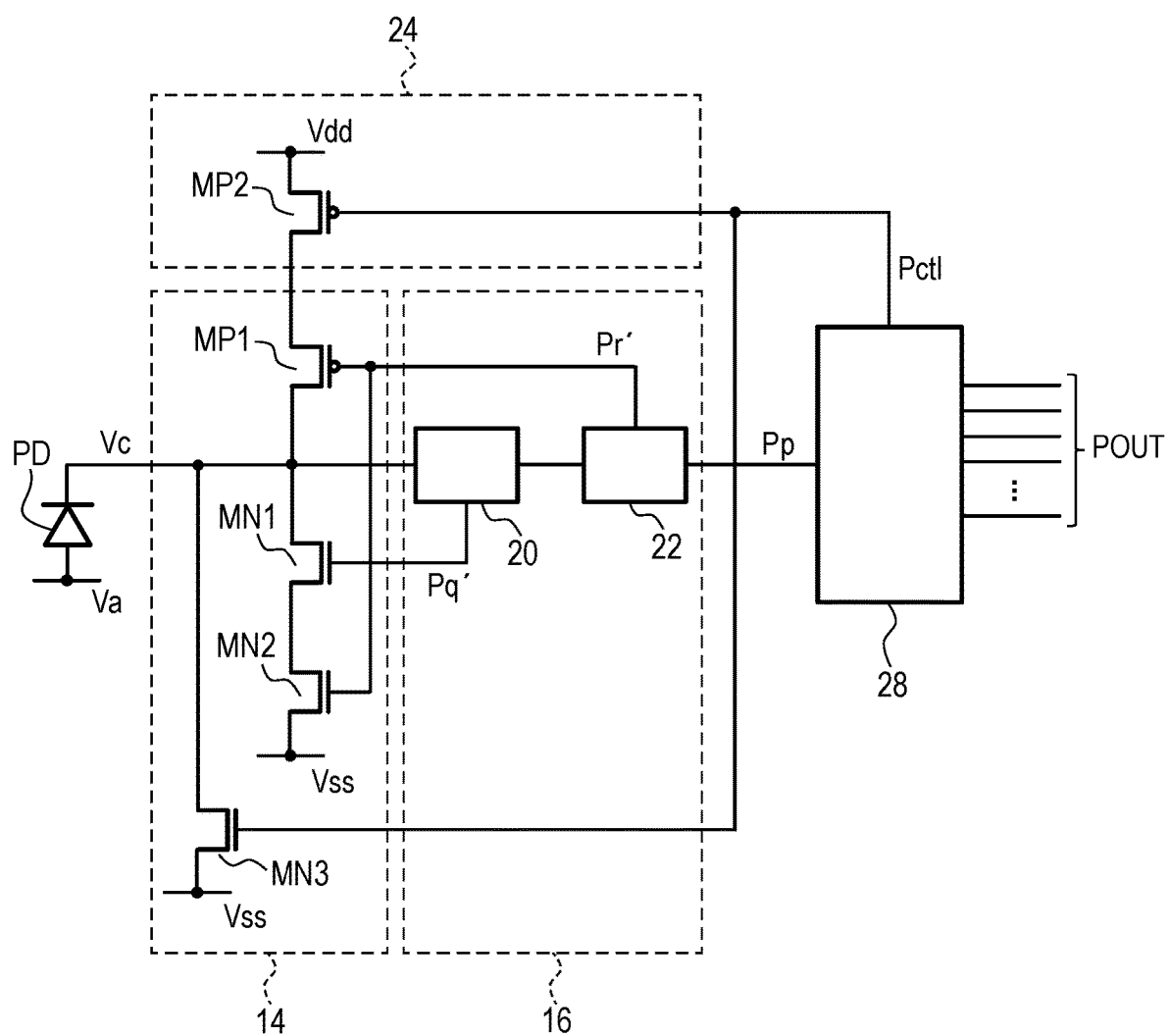
FIG. 9 is a circuit diagram illustrating a configuration example of a pixel in the photoelectric conversion device according to the fourth embodiment of the present disclosure.
Figure 10:
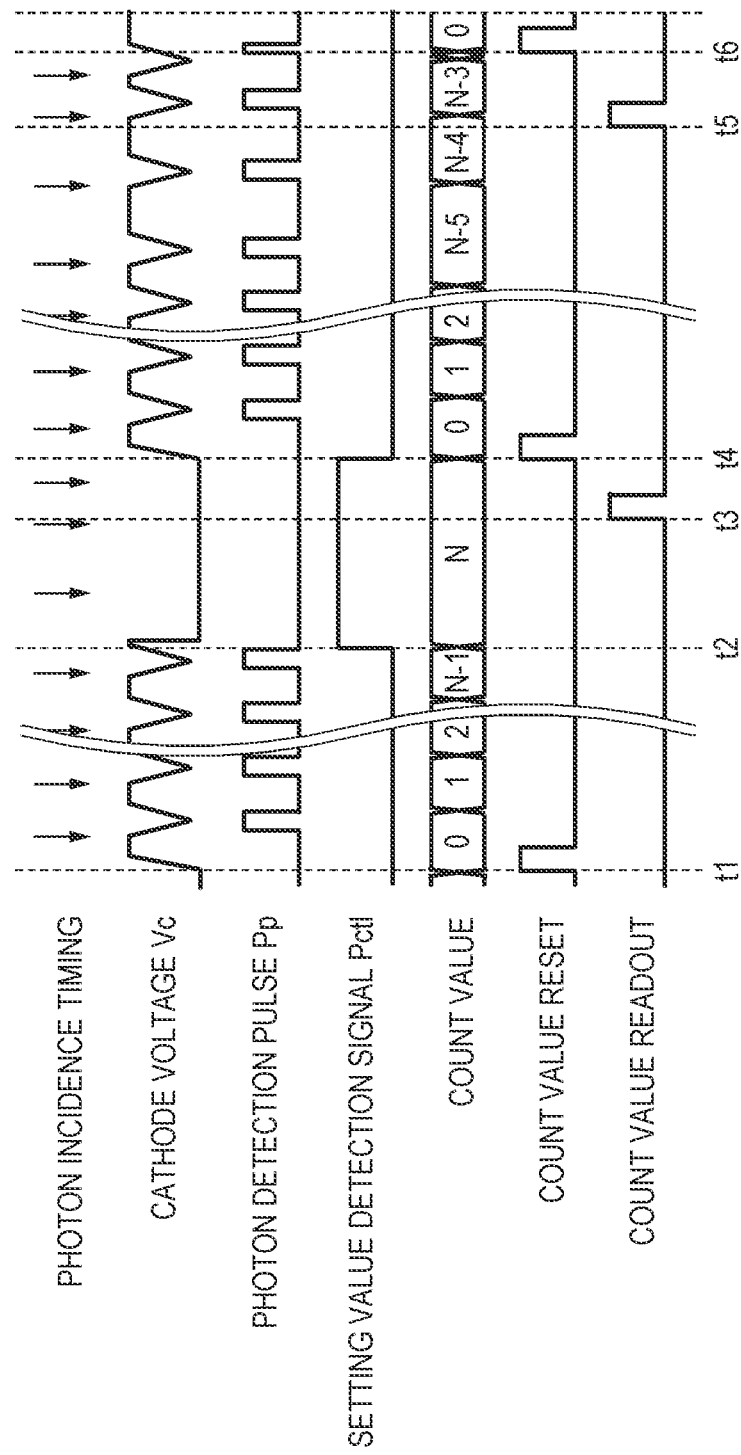
FIG. 10 is a timing diagram illustrating an operation of the photoelectric conversion device according to the fourth embodiment of the present disclosure.

A photoelectric conversion device according to a fourth embodiment of the present disclosure will be described with reference to FIG. 8 to FIG. 10. The same components as those of the photoelectric conversion device according to the first to third embodiments are labeled with the same references, and the description thereof will be omitted or simplified. FIG. 8 is a diagram illustrating a general configuration of a pixel in the photoelectric conversion device according to the present embodiment. FIG. 9 is a circuit diagram illustrating a configuration example of a pixel in the photoelectric conversion device according to the present embodiment. FIG. 10 is a timing diagram illustrating an operation of the photoelectric conversion device according to the present embodiment.

As illustrated in FIG. 8, in the pixel P in the photoelectric conversion device according to the present embodiment, the signal generation circuit 12 further includes a power supply voltage control circuit 24 in addition to the cathode voltage control circuit 14 and the control circuit 16. Accordingly, the configurations of the cathode voltage control circuit 14 and the control circuit 16 are different from those of the photoelectric conversion device according to the first to third embodiments. Other features are the same as those of the photoelectric conversion devices according to the first to third embodiments. Note that, in this specification, the power supply voltage control circuit 24 may be referred to as a power supply voltage control unit.

That is, as illustrated in FIG. 9, for example, the cathode voltage control circuit 14 in the photoelectric conversion device according to the present embodiment may be formed of a p-channel MOS transistor MP1 and n-channel MOS transistors MN1, MN2, and MN3. The drain terminal of the p-channel MOS transistor MP1, the drain terminal of the n-channel MOS transistor MN1, and the drain terminal of the n-channel MOS transistor MN3 are connected to the cathode terminal of the photodiode PD. The source terminal of the n-channel MOS transistor MN1 is connected to the drain terminal of the n-channel MOS transistor MN2. The source terminal of the n-channel MOS transistor MN2 and the source terminal of the n-channel MOS transistor MN3 are connected to the reference voltage node of the voltage Vss.

Further, as illustrated in FIG. 9, for example, the control circuit 16 in the photoelectric conversion device according to the present embodiment may be formed of the timing control circuits 20 and 22. The connection node of the cathode terminal of the photodiode PD, the drain terminal of the p-channel MOS transistor MP1, and the drain terminals of the n-channel MOS transistors MN1 and MN3 is connected to the counter 28 via the timing control circuits 20 and 22. The gate terminal of the n-channel MOS transistor MN1 is connected to the timing control circuit 20. The gate terminal of the p-channel MOS transistor MP1 and the gate terminal of the n-channel MOS transistor MN2 are connected to the timing control circuit 22. The gate terminal of the n-channel MOS transistor MN3 is connected to the counter 28.

Further, the power supply voltage control circuit 24 includes a p-channel MOS transistor MP2. The drain terminal of the p-channel MOS transistor MP2 is connected to the source terminal of the p-channel MOS transistor MP1. The source terminal of the p-channel MOS transistor MP2 is connected to the power supply node of the voltage Vdd. The gate terminal of the p-channel MOS transistor MP2 is connected to the counter 28.

The timing control circuits 20 and 22 are circuits for controlling the timing of the recharge operation or the quench operation in the cathode voltage control circuit 14 in response to a change in the voltage Vc of the cathode terminal of the photodiode PD in the same manner as the third embodiment. The feature that the timing control circuits 20 and 22 have a function as a waveform shaping unit that outputs the photon detection pulse Pp is also the same as described above.

The p-channel MOS transistor MP1 and the n-channel MOS transistor MN2 are controlled by the control signal Pr' output from the timing control circuit 22. The re-channel MOS transistor MN1 is controlled by the control signal Pq' output from the timing control circuit 20. The p-channel MOS transistor MP2 and the n-channel MOS transistor MN3 are controlled by the setting value detection signal Pctl output from the counter 28.

When the count value of the counter 28 reaches the arbitrary setting value N, the setting value detection signal Pctl transitions to the H level, and the p-channel MOS transistor MP2 of the power supply voltage control circuit 24 is turned off. This stops supplying the power supply voltage to the p-channel MOS transistor MP1 in the cathode voltage control circuit 14 and stops recharging the cathode terminal of the photodiode PD. Further, in response to transition of the setting value detection signal Pctl to the H level, the n-channel MOS transistor MN3 of the cathode voltage control circuit 14 is turned on, and the voltage Vc of the cathode terminal of the photodiode PD is fixed to the voltage Vss. In this sense, the power supply voltage control circuit 24 functions as a control unit that controls an applied voltage to the photodiode PD, more specifically, controls the power supply voltage supplied to the cathode terminal of the photodiode PD.

Next, an operation example of the photoelectric conversion device according to the present embodiment will be described by using FIG. 10. FIG. 10 illustrates the photon incidence timing, the count value, and the timings of resetting a count value and reading out a count value in addition to the voltage Vc, the photon detection pulse Pp, and the setting value detection signal Pctl.

It is here assumed that the timing control circuit 20 outputs, as the logically inverted control signal Pq', a signal obtained by converting a change in the voltage Vc of the cathode terminal of the photodiode PD into a pulse signal, after a predetermined delay time. Further, it is assumed that the timing control circuit 22 outputs the control signal Pq' as the logically inverted control signal Pr' after a predetermined delay time.

First, at time t1, the count value reset signal transitions to the H level, and the count value of the counter 28 is reset to zero (0).

In response to a photon entering the photodiode PD, an avalanche current occurs in the photodiode PD, and the voltage Vc of the cathode terminal of the photodiode PD decreases. When the voltage Vc of the cathode terminal starts decreasing, the control signal Pq' output from the timing control circuit 20 in response to a change in the voltage Vc transitions to the H level after a predetermined delay time. At this time, since the control signal Pr' output from the timing control circuit 22 in the initial state is at the H level, the n-channel MOS transistors MN1 and MN2 are turned on in response to the H-level control signals Pq' and Pr'. Thereby, the reduction of the voltage Vc further continues via the n-channel MOS transistors MN1 and MN2, the reverse bias voltage applied between both the terminals of the photodiode PD becomes less than the breakdown voltage Vbd, and the avalanche current no longer occurs (quench operation).

Next, when the control signal Pr' transitions to the L level after a predetermined delay time in response to the H-level control signal Pq', the p-channel MOS transistor MP1 is turned on, and the n-channel MOS transistor MN2 is turned off. Thereby, recharging of the photodiode PD is started, and the reverse bias voltage applied to both the terminals of the photodiode PD returns to the voltage that is greater than or equal to the breakdown voltage Vbd again (recharge operation).

The recharge operation and the quench operation described above are repeated at every time there is incidence of a photon, and the photon detection pulses Pp are output from the control circuit 16 to the counter 28, where the number of photon detection pulses Pp corresponds to the number of repetitions. The counter 28 counts the photon detection pulse Pp output from the control circuit 16. Such a series of operations is repeated until time t2 when the count value of the photon detection pulse Pp reaches a predetermined setting value N.

At the time t2, when the count value reaches the arbitrary setting value N, the counter 28 controls the setting value detection signal Pctl from the L level to the H level. Thereby, the p-channel MOS transistor MP2 is turned off, and the n-channel MOS transistor MN3 is turned on. As a result, the cathode terminal of the photodiode PD is connected to the reference voltage node via the n-channel MOS transistor MN3, and the voltage Vc of the cathode terminal decreases to the voltage Vss. At this time, since the reverse bias voltage applied between both the terminals of the photodiode PD is less than the breakdown voltage Vbd, the avalanche current no longer occurs, and the cathode voltage Vss is fixed. Thereby, the circuit operations of the cathode voltage control circuit 14 and the control circuit 16 are stopped, and the power consumption is suppressed to the minimum.

Next, at time t3, the count value (the setting value N) held by the counter 28 is read out to an external circuit.

Next, at time t4, the count value reset signal transitions to the H level, and the count value of the counter 28 is reset to zero (0). Accordingly, counting of the number of incident photons is newly started by a similar operation.

Next, at time t5, the count value (N−4) held by the counter 28 is read out to the external circuit.

Next, at time t6, a count value reset signal transitions to the H level, and the count value of the counter 28 is reset to zero (0). Note that, since the count value does not reach the setting value N until the time t6, the setting value detection signal Pctl remains at the L level during a period from the time t4 to the time t6. In such a way, unless the count value reaches the arbitrary setting value N, the photon detection operation continues until the time immediately before the count value is reset.

As described above, according to the present embodiment, it is possible to achieve a reduction in power consumption and an improvement in stability of the circuit operation in the photoelectric conversion device.

Fifth Embodiment

Figure 11:
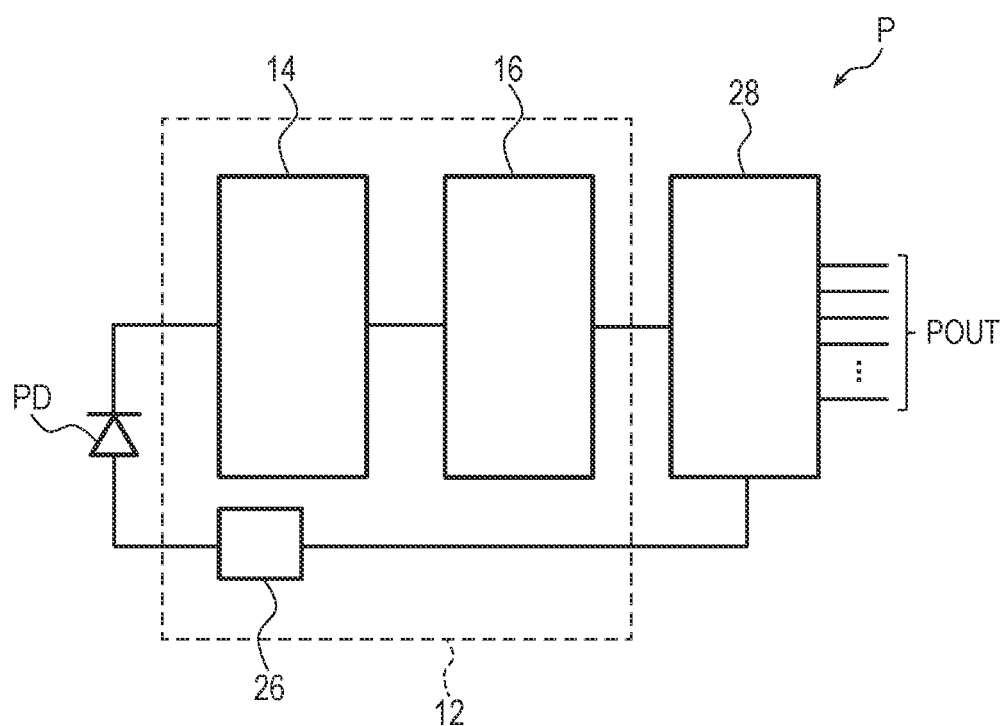
FIG. 11 is a diagram illustrating a general configuration of a pixel in a photoelectric conversion device according to a fifth embodiment of the present disclosure.
Figure 12:
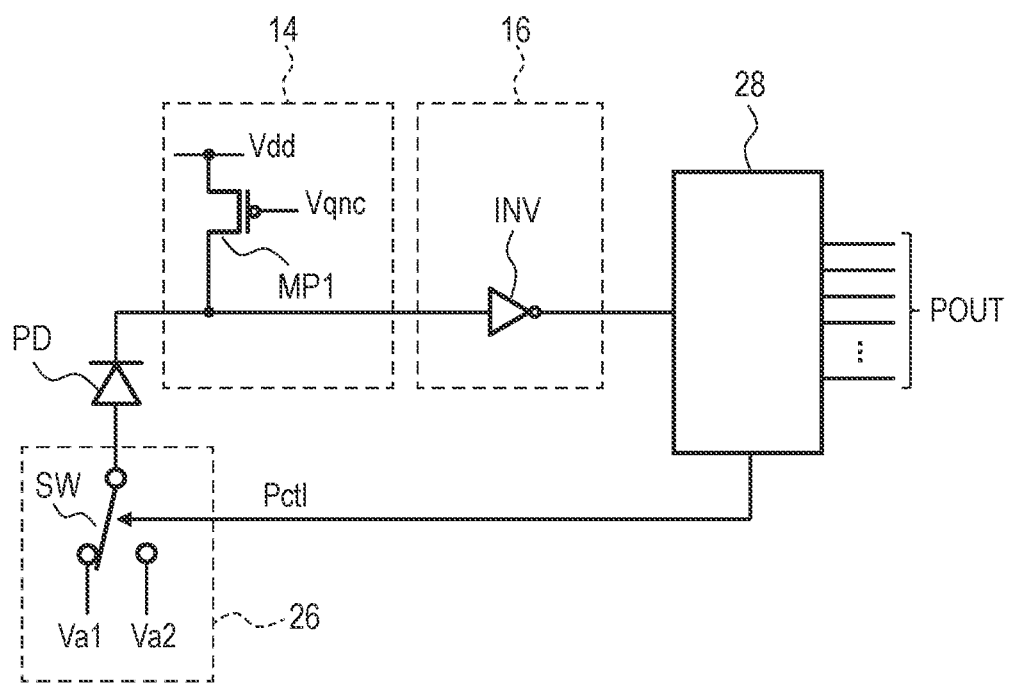
FIG. 12 is a circuit diagram illustrating a configuration example of a pixel in the photoelectric conversion device according to the fifth embodiment of the present disclosure.

A photoelectric conversion device according to a fifth embodiment of the present disclosure will be described with reference to FIG. 11 and FIG. 12. The same components as those of the photoelectric conversion device according to the first to fourth embodiments are labeled with the same references, and the description thereof will be omitted or simplified. FIG. 11 is a diagram illustrating a general configuration of a pixel in the photoelectric conversion device according to the present embodiment. FIG. 12 is a circuit diagram illustrating a configuration example of a pixel in the photoelectric conversion device according to the present embodiment.

In the pixel P in the photoelectric conversion device according to the present embodiment, as illustrated in FIG. 11, the signal generation circuit 12 further includes an anode voltage control circuit 26 in addition to the cathode voltage control circuit 14 and the control circuit 16. Accordingly, the configuration of the cathode voltage control circuit 14 and the control circuit 16 is different from that of the photoelectric conversion device according to the first to fourth embodiments. Other features are the same as those of the photoelectric conversion devices according to the first to fourth embodiments. Note that, in this specification, the anode voltage control circuit 26 may be referred to as an anode voltage control unit.

That is, as illustrated in FIG. 12, for example, the cathode voltage control circuit 14 in the photoelectric conversion device according to the present embodiment may be formed of a p-channel MOS transistor MP1. The drain terminal of the p-channel MOS transistor MP1 is connected to the cathode terminal of the photodiode PD. The source terminal of the p-channel MOS transistor MP1 is connected to the power supply node of the voltage Vdd. The voltage Vqnc is supplied to the gate terminal of the p-channel MOS transistor MP1.

Further, as illustrated in FIG. 12, for example, the control circuit 16 in the photoelectric conversion device according to the present embodiment may be formed of an inverter circuit INV. The connection node of the cathode terminal of the photodiode PD and the drain terminal of the p-channel MOS transistor MP1 is connected to the input terminal of the inverter circuit INV. The output terminal of the inverter circuit INV is connected to the counter 28.

Further, the anode voltage control circuit 26 includes a switch SW. The switch SW has a function of switching the voltage supplied to the anode terminal of the photodiode PD to any one of a voltage Va1 and a voltage Va2 in response to the setting value detection signal Pctl supplied from the counter 28. For example, the anode voltage control circuit 26 supplies the voltage Va1 to the node terminal of the photodiode PD when the setting value detection signal Pctl is at the L level. On the other hand, the anode voltage control circuit 26 switches the switch SW to supply the voltage Va2 to the anode terminal of the photodiode PD when the setting value detection signal Pctl is at the H level. That is, the anode voltage control circuit 26 functions as a control unit that controls the applied voltage to the photodiode PD, more specifically, controls the applied voltage to the anode terminal of the photodiode PD. Here, the voltages Va1 and Va2 have the following relationship with respect to the voltage Vdd and the breakdown voltage Vbd.

$$|Vdd-Va1|>|Vbd|>|Vdd-Va2|$$

The counter 28 outputs an L-level setting value detection signal Pctl when the count value is less than the arbitrary setting value N. The anode voltage control circuit 26 controls the switch SW so as to supply the voltage Va1 to the anode terminal of the photodiode PD in response to the L-level setting value detection signal Pctl. At this time, the voltage applied between both the terminals of the photodiode PD (Vdd−Va1) is greater than the breakdown voltage Vbd of the photodiode PD, which results in a condition where avalanche multiplication occurs due to incidence of a photon.

The counter 28 outputs an H-level setting value detection signal Pctl when the count value reaches the arbitrary setting value N. The anode voltage control circuit 26 controls the switch SW so as to supply the voltage Va2 to the anode terminal of the photodiode PD in response to the H-level setting value detection signal Pctl. At this time, the voltage applied between both the terminals of the photodiode PD (Vdd−Va2) is less than the breakdown voltage Vbd of the photodiode PD, and thus no avalanche multiplication occurs due to incidence of a photon.

Therefore, also in the photoelectric conversion device according to the present embodiment, when the count value reaches the arbitrary setting value N, the operation of the signal generation circuit 12 stops until the count value of the counter 28 is reset.

As described above, according to the present embodiment, it is possible to achieve a reduction in power consumption and an improvement in stability of the circuit operation in the photoelectric conversion device.

Sixth Embodiment

Figure 13:
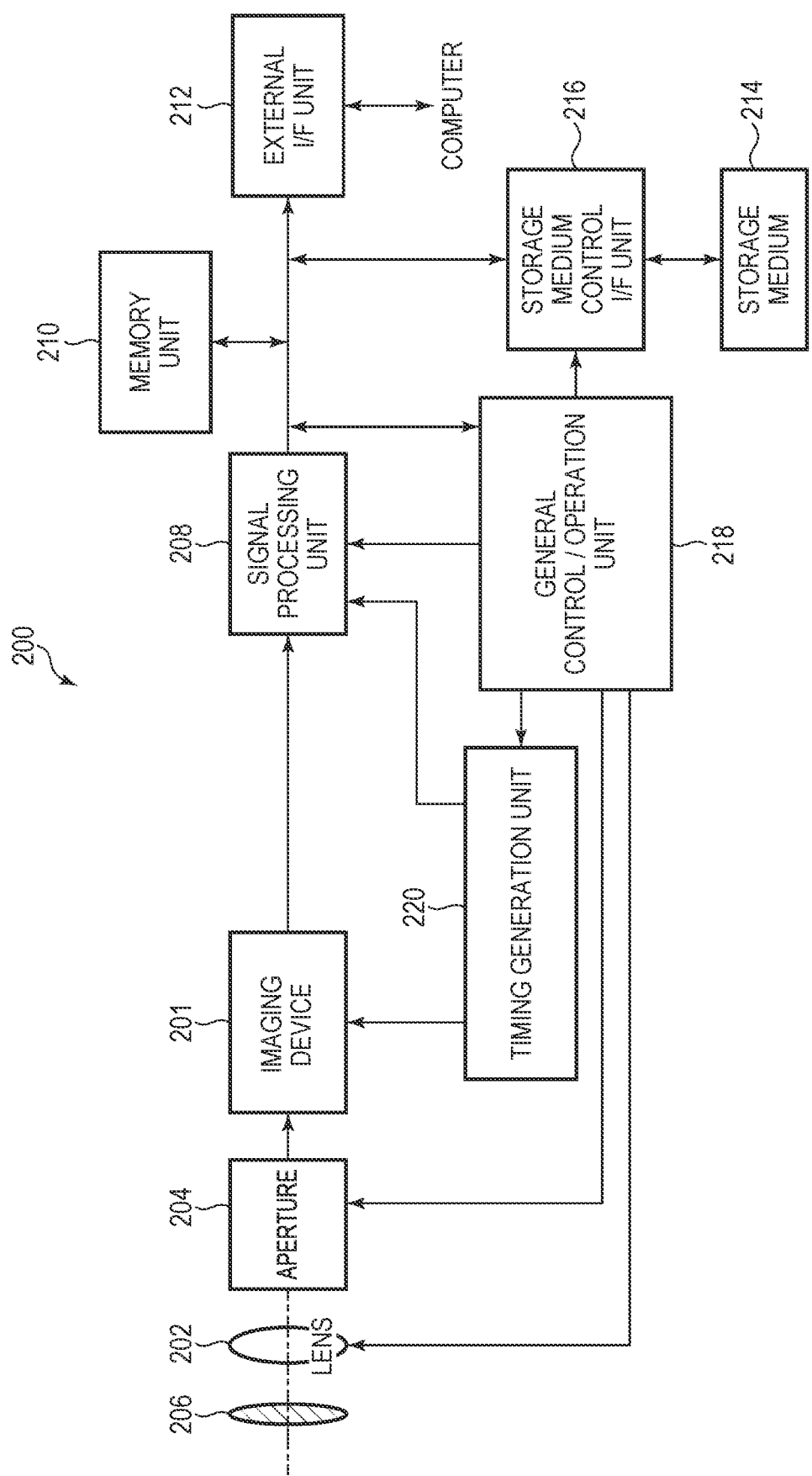
FIG. 13 is a block diagram illustrating a general configuration of an imaging system according to a sixth embodiment of the present disclosure.

An imaging system according to a sixth embodiment of the present disclosure will be described with reference to FIG. 13. FIG. 13 is a block diagram illustrating a general configuration of the imaging system according to the present embodiment.

The photoelectric conversion device 100 described in the first to fifth embodiments described above can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 13 illustrates a block diagram of a digital still camera as an example out of these examples.

An imaging system 200 illustrated as an example in FIG. 13 includes an imaging device 201, a lens 202 that captures an optical image of an object onto the imaging device 201, an aperture 204 for changing a light amount passing through the lens 202, and a barrier 206 for protecting the lens 202. The lens 202 and the aperture 204 form an optical system that converges a light onto the imaging device 201. The imaging device 201 is the photoelectric conversion device 100 described in any of the first to fifth embodiments and converts an optical image captured by the lens 202 into image data.

Further, the imaging system 200 includes a signal processing unit 208 that processes an output signal output from the imaging device 201. The signal processing unit 208 preforms analog-to-digital (AD) conversion that converts an analog signal output from the imaging device 201 into a digital signal. In addition, the signal processing unit 208 performs various correction or an operation to perform compression and output image data, if necessary. The AD conversion unit that is a part of the signal processing unit 208 may be formed on a semiconductor substrate on which the imaging device 201 is provided or formed on a semiconductor substrate separately from the imaging device 201. Further, the imaging device 201 and the signal processing unit 208 may be formed on the same semiconductor substrate.

Furthermore, the imaging system 200 includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

Furthermore, the imaging system 200 includes a general control/operation unit 218 that performs various calculation and controls the entire digital still camera and a timing generation unit 220 that outputs various timing signals to the imaging device 201 and the signal processing unit 208. Here, the timing signal or the like may be input from the outside, and the imaging system 200 may have at least the imaging device 201 and the signal processing unit 208 that processes an output signal output from the imaging device 201.

The imaging device 201 outputs an imaging signal to the signal processing unit 208. The signal processing unit 208 performs predetermined signal processing on an imaging signal output from the imaging device 201 and outputs image data. The signal processing unit 208 uses an imaging signal to generate an image.

As described above, according to the present embodiment, the imaging system to which the photoelectric conversion device 100 according to the first to fifth embodiment is applied can be realized.

Seventh Embodiment

Figure 14A:
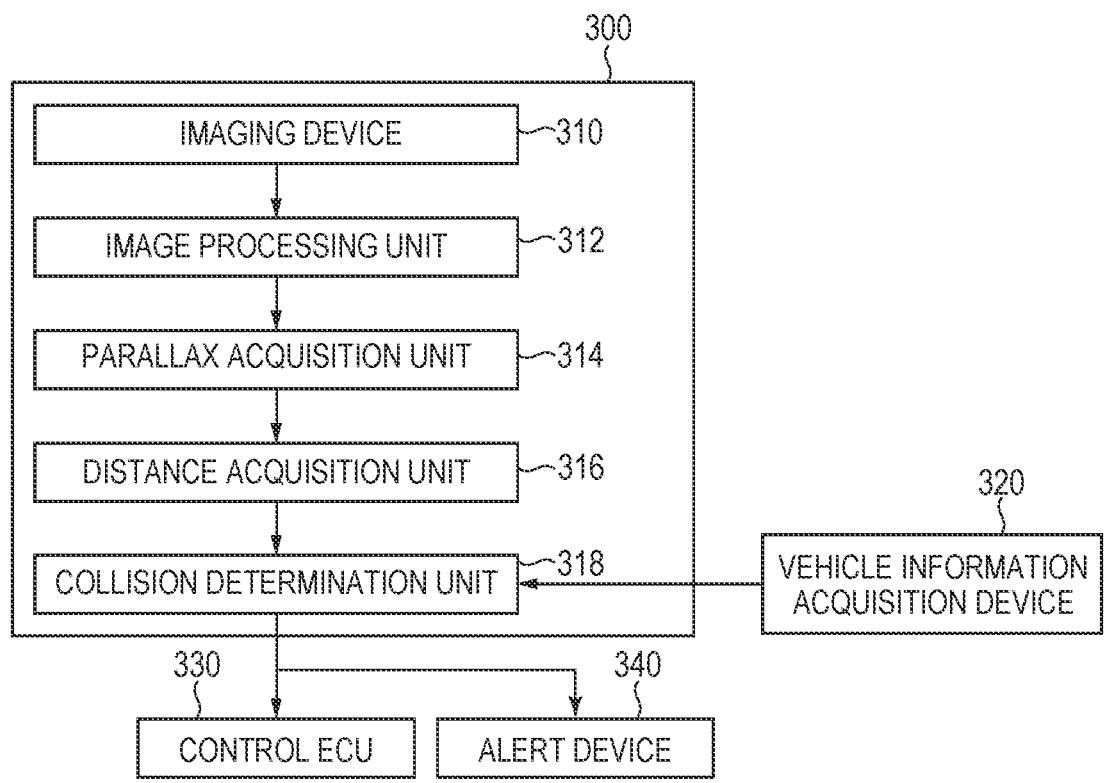
FIG. 14A is a diagram illustrating a configuration example of an imaging system according to a seventh embodiment of the present disclosure.
Figure 14B:
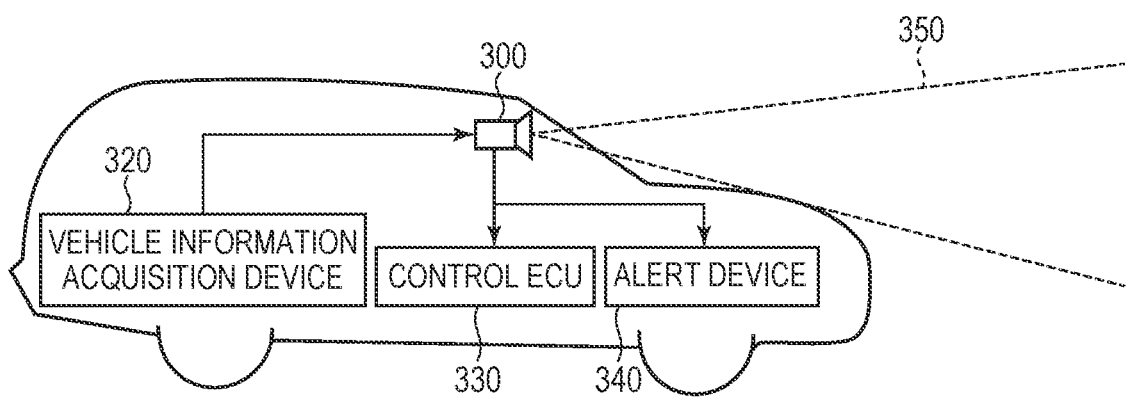
FIG. 14B is a diagram illustrating a configuration example of a moving body according to the seventh embodiment of the present disclosure.

An imaging system and a moving body according to a seventh embodiment of the present disclosure will be described with reference to FIG. 14A and FIG. 14B. FIG. 14A is a diagram illustrating a configuration of the imaging system according to the present embodiment. FIG. 14B is a diagram illustrating a configuration of the moving body according to the present embodiment.

FIG. 14A illustrates an example of an imaging system related to an on-vehicle camera. An imaging system 300 includes an imaging device 310. The imaging device 310 is the photoelectric conversion device 100 described in any of the above first to fifth embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition device that acquires distance information on the distance to the object. That is, the distance information is information on a parallax, a defocus amount, a distance to an object, or the like. The collision determination unit 318 may use any of the distance information to determine the collision possibility. The distance information acquisition device may be implemented by dedicatedly designed hardware or may be implemented by a software module. Further, the distance information acquisition unit may be implemented by a Field Programmable Gate Array (FPGA), an Application Specific Integrated Circuit (ASIC), or the like or may be implemented by a combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high includes the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 14B illustrates the imaging system when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a moving body (movable apparatus) such as a ship, an airplane, or an industrial robot, for example. In addition, the imaging system can be widely applied to a device which utilizes object recognition, such as an intelligent transportation system (ITS), without being limited to moving body.

Modified Embodiments

The present disclosure is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present disclosure.

Further, each circuit configuration of the cathode voltage control circuit 14, the control circuit 16, or the like illustrated in the first to fifth embodiments described above is an example and can be formed of another circuit that may realize the same operation as described above.

Further, the imaging systems illustrated in the above sixth and seventh embodiments are examples of an imaging system to which the photoelectric conversion device of the present disclosure may be applied, and an imaging system to which the photoelectric conversion device of the present disclosure can be applied is not limited to the configuration illustrated in FIG. 13 and FIG. 14A.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-218224, filed Nov. 21, 2018, which is hereby incorporated by reference herein in its entirety.

What is claimed is:

1. A photoelectric conversion device comprising:
   an avalanche multiplying photodiode;
   a signal generation unit that includes a control unit configured to control an applied voltage to the photodiode and generates a photon detection pulse based on an output generated by incidence of a photon to the photodiode; and
   a counter that counts the photon detection pulse output from the signal generation unit, wherein the counter outputs a setting value detection signal when a count value of the photon detection pulse reaches a predetermined setting value, and
   wherein in response to receiving the setting value detection signal, the control unit controls the applied voltage to the photodiode so as to stop generation of an avalanche current in the photodiode,
   wherein a cathode terminal of the photodiode is connected to the signal generation unit,
   wherein the signal generation unit further includes a cathode voltage control unit controlled by the control unit and configured to control the applied voltage to the cathode terminal of the photodiode and stop generation of an avalanche current in the photodiode by controlling the cathode voltage control unit by the setting value detection signal, and
   wherein a power supply voltage supplied to the control circuit and a power supply voltage supplied to and controlled by the cathode voltage control unit are the same voltage.

2. The photoelectric conversion device according to claim 1, wherein the cathode voltage control unit includes a recharge circuit configured to increase the applied voltage to the photodiode and turns off the recharge circuit in response to the setting value detection signal.

3. The photoelectric conversion device according to claim 1, wherein the cathode voltage control unit includes a quench circuit configured to decrease the applied voltage to the photodiode and turns on the quench circuit in response to the setting value detection signal.

4. The photoelectric conversion device according to claim 1,
wherein the cathode voltage control unit includes a recharge circuit configured to increase the applied voltage to the photodiode, a quench circuit configured to decrease the applied voltage to the photodiode, and a timing control unit configured to output a quench control signal and a recharge control signal at a predetermined timing in accordance with incidence of a photon to the photodiode, and
wherein the cathode voltage control unit turns off the recharge circuit in response to the recharge control signal or the setting value detection signal, and turns on the quench circuit in response to the quench control signal or the setting value detection signal.

5. The photoelectric conversion device according to claim 2, wherein the recharge circuit disconnects the cathode terminal of the photodiode from a power supply node in response to the setting value detection signal.

6. The photoelectric conversion device according to claim 4, wherein the recharge circuit disconnects the cathode terminal of the photodiode from a power supply node in response to the setting value detection signal.

7. The photoelectric conversion device according to claim 3, wherein the quench circuit connects a cathode terminal of the photodiode to a reference voltage node in response to the setting value detection signal.

8. The photoelectric conversion device according to claim 4, wherein the quench circuit connects a cathode terminal of the photodiode to a reference voltage node in response to the setting value detection signal.

9. The photoelectric conversion device according to claim 1, wherein the signal generation unit further includes a power supply voltage control unit configured to control the power supply voltage applied to the cathode terminal of the photodiode and stops generation of an avalanche current in the photodiode by controlling the power supply voltage control unit.

10. The photoelectric conversion device according to claim 1 further comprising a pixel region in which a plurality of pixels are arranged over a plurality of rows and a plurality of columns and each of the plurality of pixels includes the photodiode, the signal generation unit, and the counter.

11. The photoelectric conversion device according to claim 4,
wherein the recharge circuit is formed of a p-channel MOS transistor, and
wherein the quench circuit is formed of an n-channel MOS transistor.

12. The photoelectric conversion device according to claim 1, wherein the control unit is a passive quench circuit.

13. A method of driving a photoelectric conversion device including an avalanche multiplying photodiode, a signal generation unit that controls an applied voltage to the photodiode and generates a photon detection pulse based on an output generated by incidence of a photon to the photodiode, and a counter that counts the photon detection pulse output from the signal generation unit, the method comprising:
in a counting period from reset of the counter to readout of a count value, increasing the count value in response to the photon detection pulse when the count value does not reach a predetermined setting value and stopping generation of an avalanche current in the photodiode when the count value reaches the setting value,
wherein a cathode terminal of the photodiode is connected to the signal generation unit, and
wherein the signal generation unit comprises a cathode voltage control unit controlling the voltage applied to the cathode terminal of the photodiode and stopping generation of an avalanche current in the photodiode when the count value reaches the setting value and a control unit controlling the cathode voltage control unit, and
wherein a power supply voltage supplied to the control circuit and a power supply voltage supplied to and controlled by the cathode voltage control unit are the same voltage.

14. An imaging system comprising:
the photoelectric conversion device according to claim 1, and
a signal processing unit configured to process a signal output from the photoelectric conversion device.

15. A moving body comprising:
the photoelectric conversion device according to claim 1;
a distance information acquisition device that acquires distance information on a distance to an object, from a parallax image based on signals from the photoelectric conversion device; and
a control device that controls the moving body based on the distance information.

* * * * *